United States Patent [19]

Evans

[11] 4,407,931

[45] Oct. 4, 1983

[54] PHOTOGRAPHIC PRODUCTS AND PROCESSES EMPLOYING NONDIFFUSIBLE YELLOW AZO METAL COMPLEXED DYE-RELEASING COMPOUNDS AND PRECURSORS THEREOF

[75] Inventor: Steven Evans, Rochester, N.Y.

[73] Assignee: Eastman Kodak Company, Rochester, N.Y.

[21] Appl. No.: 392,509

[22] Filed: Jun. 28, 1982

[51] Int. Cl.$^3$ .......................... G03C 1/40; G03C 1/10; G03C 7/00; G03C 5/54
[52] U.S. Cl. .................................... 430/223; 430/222; 430/226; 430/241; 430/242; 430/562; 430/563
[58] Field of Search .............. 430/222, 223, 225, 226, 430/562, 563, 241, 242

[56] References Cited

U.S. PATENT DOCUMENTS 3,254,072  5/1966  Stright .................................. 260/155
4,148,643  4/1979  Chapman et al. .................... 430/226
4,358,527  11/1982 Bailey et al. ......................... 430/226

FOREIGN PATENT DOCUMENTS 762451  7/1967  Canada .
52-106727  3/1977  Japan .

OTHER PUBLICATIONS

Evans et al., U.S. Ser. No. 458,499, filed Jan. 17, 1983.
Reczek et al., U.S. Ser. No. 458,501, filed Jan, 17, 1983.

Primary Examiner—Richard L. Schilling
Attorney, Agent, or Firm—Harold E. Cole

[57] ABSTRACT

Photographic elements, diffusion transfer assemblages, coordination complexes and processes are described which employ a novel nondiffusible compound having a releasable yellow dye moiety or precursor thereof, the compound having the formula:

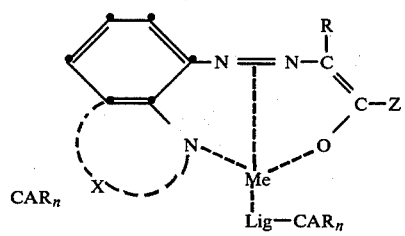

wherein:
(a) X represents the atoms necessary to complete a 5- or 6-membered aromatic heterocyclic fused ring;
(b) Z represents alkyl, substituted alkyl, aryl or substituted aryl;
(c) R represents CN or J—L;
(d) J represents a bivalent

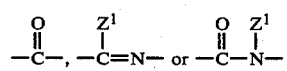

group;
(e) L represents alkyl, substituted alkyl, aryl, substituted aryl, or can be taken together with Z to complete a carbonyl-containing 5- or 6-membered heterocyclic or carbocyclic ring;
(f) $Z^1$ represents the same groups as Z;
(g) each CAR independently represents a ballasted carrier moiety capable of releasing the diffusible yellow dye moiety or precursor thereof as a function of development of a silver halide emulsion layer under alkaline conditions;
(h) each n is 0 or 1, with the proviso that at least one n is 1;
(i) Lig is a monoanionic tridentate ligand; and
(j) Me is a polyvalent, hexacoordinate metal ion.

38 Claims, No Drawings

PHOTOGRAPHIC PRODUCTS AND PROCESSES EMPLOYING NONDIFFUSIBLE YELLOW AZO METAL COMPLEXED DYE-RELEASING COMPOUNDS AND PRECURSORS THEREOF

This invention relates to photography and more particularly to color diffusion transfer photography employing certain nondiffusible, premetallized, yellow, redox dye-releasing (RDR) compounds which, as a function of development of a silver halide emulsion layer, release a diffusible yellow dye or precursor thereof to form a metal-complexed dye image in an image-receiving layer.

U.S. Pat. No. 4,148,643 of Chapman et al discloses nondiffusible compounds having a releasable arylazo-enol dye moiety. There is no disclosure in this patent, however, that those compounds could be premetallized. There is also no disclosure in this patent that a fused heterocyclic ring system attached to the azo linkage would provide a more stable 2:1 dye:metal complex than a hydroxy chelating group ortho to the azo linkage, as will be shown by the comparative tests hereinafter.

U.S. Pat. No. 3,254,072 relates to monoazoquinoline dyestuffs, which may be metal-complexed, and used for dyeing polymers. There is no disclosure in this patent, however, that carrier moieties could be attached to those compounds, or that they could be premetallized or that they could be used in photographic elements.

Canadian Pat. No. 762,451 relates to metallizable textile dyes comprising compounds having a quinoline moiety linked through an azo linkage to a heterocyclic moiety. There is no disclosure in this patent, however, that a quinoline moiety could be linked through an azo linkage to a β-ketonitrile moiety as disclosed herein.

A premetallized azo dye attached to a ballasted carrier moiety which releases the dye as a function of development is disclosed in Japanese Publication No. 106727/1977. The specific compounds of my invention are not disclosed, however.

U.S. application Ser. No. 380,843 of Evans and Elwood, filed May 21, 1982, abandoned in favor of continuation-in-part application Ser. No. 458,499, filed Jan. 17, 1983, entitled PHOTOGRAPHIC PRODUCTS AND PROCESSES EMPLOYING NOVEL NONDIFFUSIBLE MAGENTA DYE-RELEASING COMPOUNDS AND PRECURSORS THEREOF and U.S. application Ser. No. 380,844 of Reczek and Elwood, filed May 21, 1982, abandoned in favor of continuation-in-part application Ser. No. 458,501, filed Jan. 17, 1983, entitled PHOTOGRAPHIC PRODUCTS AND PROCESSES EMPLOYING NOVEL NONDIFFUSIBLE CYAN DYE-RELEASING COMPOUNDS relate to cyan and magenta dye-releasing compounds which may have a quinoline moiety as part of the general structure of the compounds. These applications, however, do not disclose the compounds described herein having a β-ketonitrile moiety.

U.S. application Ser. No. 324,214 of Bailey et al., filed Nov. 23, 1981, entitled PHOTOGRAPHIC PRODUCTS EMPLOYING NONDIFFUSIBLE METAL-COMPLEXED AZO DYE-RELEASING COMPOUNDS AND PRECURSORS THEREOF, now U.S. Pat. No. 4,358,527, issued Nov. 9, 1982, relates to various metal-complexed, azo dye-releasing compounds. This application, however, does not disclose the compounds described herein having a β-ketonitrile moiety.

It would be desirable to provide improved metal-complexed, yellow dye-releasing compounds so that the dye which is released imagewise during processing can diffuse to an image-receiving layer to form a metal-complexed, dye transfer image having a better hue, minimum unwanted absorption outside the blue region of the spectrum, narrower bandwidth, rapid diffusion rate and shorter access time than those of the prior art, as well as good stability to heat, light and chemical reagents. A premetallized RDR in comparison to a metallizable RDR can be advantageous in not having to provide a metal in the mordant layer, since free metal ions sometimes tend to wander throughout the element which could cause sensitometric problems.

SUMMARY OF THE INVENTION

A photographic element in accordance with one embodiment of the invention comprises a support having thereon at least one photosensitive silver halide emulsion layer having associated therewith a dye image-providing material comprising a nondiffusible compound having at least one releasable yellow dye moiety or precursor thereof, the compound having the formula:

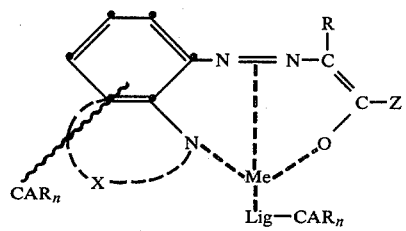

wherein:
(a) X represents the atoms necessary to complete a 5- or 6-membered aromatic heterocyclic fused ring;
(b) Z represents alkyl, substituted alkyl, aryl or substituted aryl;
(c) R represents CN or J—L;
(d) J represents a bivalent

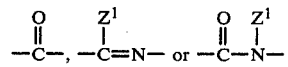

group;
(e) L represents alkyl, substituted alkyl, aryl, substituted aryl, or can be taken together with Z to complete a carbonyl-containing 5- or 6-membered heterocyclic or carbocyclic ring, such as pyrazolinone, pyrazolidinedione, chromandione or hydantoin;
(f) $Z^1$ represents the same groups as Z;
(g) each CAR independently represents a ballasted carrier moiety capable of releasing the diffusible yellow dye moiety or precursor thereof as a function of development of the silver halide emulsion layer under alkaline conditions;
(h) each n is 0 or 1, with the proviso that at least one n is 1;
(i) Lig is a monoanionic tridentate ligand; and
(j) Me is a polyvalent, hexacoordinate metal ion.

In the above formula, Me can be any polyvalent, hexacoordinate metal ion as long as it performs the desired function of forming the dye:metal complex. There can be employed, for example, zinc(II), nickel-(II), copper(II), cobalt(II), cobalt(III), platinum(II), palladium(II) or chromium(III) ions. Especially good results have been obtained with nickel(II) ions.

In the above formula, Lig can be any monoanionic tridentate ligand which will coordinate with the dye:-metal complex. There can be employed, for example, o-(2-aminoethylamino)phenol, o-(2-pyridylmethylamino)phenol, N-(2-aminoethyl)glycine, N-(2-pyridylmethylamino)glycine, N-(3-hydroxyl-2-pyridylmethylamino)glycine, 2-aminomethyl-1-methyl-4-imidazolecarboxylic acid, or another tridentate dye moiety.

In another preferred embodiment of my invention, Lig in the above formula is another dye moiety of the structure illustrated above, so that a 2:1 dye:metal complex is formed having the following structure:

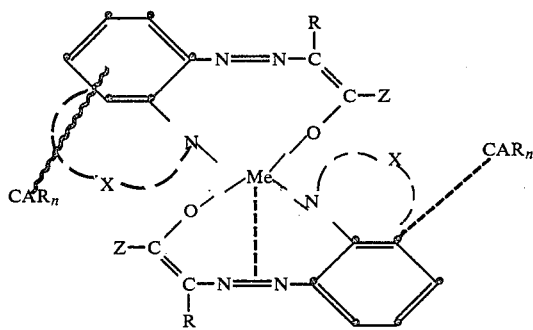

wherein each X, Z, R, CAR, n and Me is as defined above.

In a preferred embodiment of the invention, X represents the atoms necessary to complete a quinoline, quinoxaline, indolenine or benzimidazole ring. In another preferred embodiment of the invention, X represents the atoms necessary to complete a quinoline ring, Z is alkyl and R is CN. In yet another preferred embodiment of the invention, CAR is attached to the 5-position of a quinoline ring.

Z and L in the formula and definition described above can be any alkyl or aryl group (including substituted alkyl or aryl groups) as long as the diffusibility of the dye moiety is not encumbered. In general, good results have been obtained with alkyl or substituted alkyl groups having from 1 to about 12 carbon atoms such as methyl, ethyl, isopropyl, t-butyl, pentyl; arylalkyl such as benzyl; alkoxyalkyl such as methoxyethyl; aryloxy alkyl such as phenoxyethyl or alkoxy carbonylalkyl such as ethoxycarbonylmethyl; or aryl or substituted aryl groups having from 6 to about 12 carbon atoms such as phenyl, alkoxyphenyl, tolyl, carboxyphenyl, sulfamoylphenyl or naphthyl.

In another embodiment of the invention, CAR may have attached thereto two azo dye moieties in which case two dye moieties will be released from one CAR moiety.

DETAILED DESCRIPTION OF THE INVENTION

Other substituents may also be present in the rings illustrated above, such as alkyl of 1 to 6 carbon atoms, acyl, aryl of 6 to 10 carbon atoms, aralkyl, alkylsulfonyl, amino, alkoxy, halogens such as chloro or bromo, morpholino, phenylsulfamoyl, solubilizing groups such as sulfonamido, sulfamoyl, carboxy, sulfo or hydrolyzable precursors thereof.

In general, the compounds of my invention can be prepared by reaction of β-ketonitriles or β-dicarbonyl compounds with diazotized 8-aminoquinoline, 5-amino pyrazine or like derivatives.

There is great latitude in selecting a CAR moiety which is attached to the dye-releasing compounds described above. Depending upon the nature of the ballasted carrier selected, various groups may be needed to attach or link the carrier moiety to the dye. Such linking groups are considered to be a part of the CAR moiety in the above definition. It should also be noted that, when the dye moiety is released from the compound, cleavage may take place in such a position that part or all of the linking group, if one is present, and even part of the ballasted moiety, may be transferred to the image-receiving layer, along with the dye moiety. In any event, the dye nucleus as shown above can be thought of as the minimum which is transferred.

CAR moieties useful in the invention are described in U.S. Pat. Nos. 3,227,550; 3,628,952; 3,227,552 and 3,844,785 (dye released by chromogenic coupling); U.S. Pat. Nos. 3,443,939 and 3,443,940 (dye released by intramolecular ring closure); U.S. Pat. Nos. 3,698,897 and 3,725,062 (dye released from hydroquinone derivatives); U.S. Pat. No. 3,728,113 (dye released from a hydroquinonylmethyl quaternary salt); U.S. Pat. Nos. 3,719,489 and 3,443,941 (silver ion induced dye release); British Patent Publication No. 2,017,950A (dye released by a dye bleach process); U.S. Pat. Nos. 4,053,312; 4,198,235; 4,179,231; 4,055,428 and 4,149,892 (dye released by oxidation and deamidation); and U.S. Pat. Nos. 3,245,789 and 3,980,497; Canadian Pat. No. 602,607; British Pat. No. 1,464,104; *Research Disclosure* 14447, April 1976; U.S. Pat. No. 4,139,379 of Chasman et al., U.S. Pat. No. 4,232,107 and European Patent Publication No. 12908 (dye released by miscellaneous mechanisms), the disclosures of which are hereby incorporated by reference.

In a further preferred embodiment of the invention, the ballasted carrier moiety or CAR as described above may be represented by the following formula:

(Ballast—Carrier—Link)— wherein:
(a) Ballast is an organic ballasting radical of such molecular size and configuration as to render said compound nondiffusible in said photographic element during development in an alkaline processing composition;
(b) Carrier is an oxidizable acyclic, carbocyclic or heterocyclic moiety (see "The Theory of the Photographic Process", by C. E. K. Mees and T. H. James, Third Edition, 1966, pages 282 to 283), e.g., moieties containing atoms according to the following configuration:

a (—C=C)$_b$— wherein:
b is a positive integer of 1 to 2; and
a represents the radicals OH, SH, NH— or hydrolyzable precursors thereof; and (c) Link represents a group which, upon oxidation of said Carrier moiety, is capable of being hydrolytically cleaved to release the diffusible azo dye. For example, Link may be the following groups:

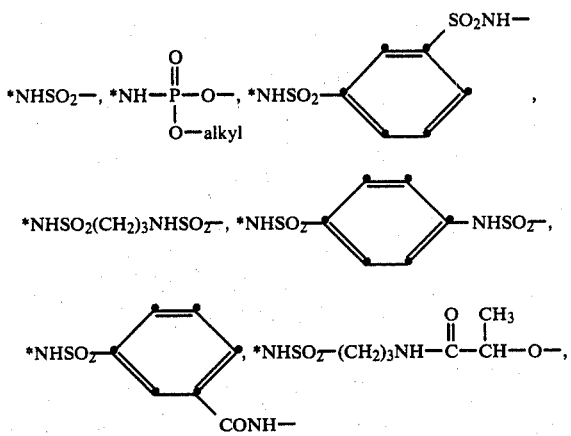

wherein * represents the position of attachment to Carrier.

The Ballast group in the above formula is not critical, so long as it confers nondiffusibility to the compound. Typical Ballast groups include long-chain alkyl radicals, as well as aromatic radicals of the benzene and naphthalene series linked to the compound. Useful Ballast groups generally have at least 8 carbon compounds, such as substituted or unsubstituted alkyl groups of 8 to 22 carbon atoms; a carbamoyl radical having 8 to 30 carbon atoms such as $-CONH(CH_2)_4-O-C_6H_3(C_5H_{11})_2$ or $-CON(C_{12}H_{25})_2$; or a keto radical having 8 to 30 carbon atoms, such as $-CO-C_{17}H_{35}$ or $-CO-C_6H_4(t-C_{12}H_{25})$.

For specific examples of Ballast-Carrier moieties useful as the CAR moiety in this invention, reference is made to the November 1976 edition of *Research Disclosure*, pages 68 through 74, and the April 1977 edition of *Research Disclosure*, pages 32 through 39, the disclosures of which are hereby incorporated by reference.

In a highly preferred embodiment of the invention, the ballasted carrier moiety or CAR in the above formula is a group having the formula:

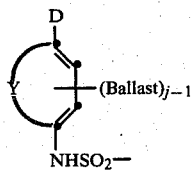

wherein:
(a) Ballast is an organic ballasting radical of such molecular size and configuration (e.g., simple organic groups or polymeric groups) as to render said compound nondiffusible in a photographic element during development in an alkaline processing composition;
(b) D is $OR^1$ or $NHR^2$ wherein $R^1$ is hydrogen or a hydrolyzable moiety, such as acetyl, mono-, di- or trichloroacetyl radicals, perfluoroacyl, pyruvyl, alkoxyacyl, nitrobenzyl, cyanobenzoyl, sulfonyl or sulfinyl, and $R^2$ is hydrogen or a substituted or unsubstituted alkyl group of 1 to 22 carbon atoms, such as methyl, ethyl, hydroxyethyl, propyl, butyl, secondary butyl, tertbutyl, cyclopropyl, 4-chlorobutyl, cyclobutyl, 4-nitroamyl, hexyl, cyclohexyl, octyl, decyl, octadecyl, dodecyl, benzyl or phenethyl (when $R^2$ is an alkyl group of greater than 8 carbon atoms, it can serve as a partial or sole Ballast);

(c) Y represents at least the atoms necessary to complete a benzene nucleus, a naphthalene nucleus, or a 5 to 7 membered heterocyclic ring, such as pyrazolone or pyrimidine; and (d) j is a positive integer of 1 to 2 and is 2 when D is $OR^1$ or when $R^2$ is hydrogen or an alkyl group of less than 8 carbon atoms.

Especially good results are obtained in the above formula when D is OH, j is 2, and Y is a naphthalene nucleus.

Examples of the CAR moiety in this highly preferred embodiment are disclosed in U.S. Pat. Nos. 4,076,529; 3,993,638 and 3,928,312, the disclosures of which are hereby incorporated by reference, and include the following:

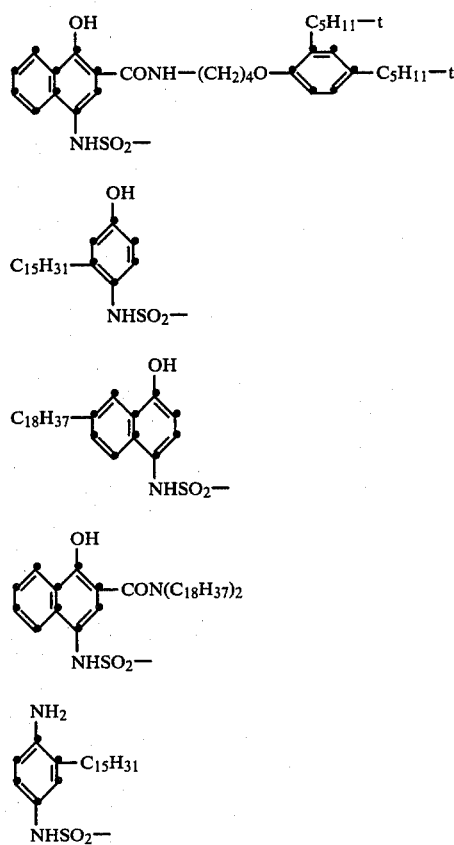

In another highly preferred embodiment of the invention, the ballasted carrier moiety or CAR in the above formulas is such that the diffusible azo dye is released as an inverse function of development of the silver halide emulsion layer under alkaline conditions. This is ordinarily referred to as positive-working dye-release chemistry. In one of these embodiments, the ballasted carrier moiety or CAR in the above formulas may be a group having the formula:

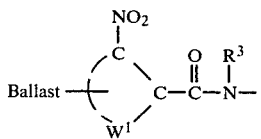

wherein:
Ballast is an organic ballasting radical of such molecular size and configuration as to render said compound nondiffusible in a photographic element during development in an alkaline processing composition;
$W^1$ represents at least the atoms necessary to complete a benzene nucleus (including various substituents thereon); and
$R^3$ is an alkyl (including substituted alkyl) radical having 1 to about 4 carbon atoms.

Examples of the CAR moiety in this formula (I) include the following:

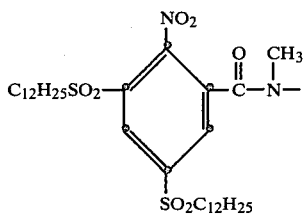

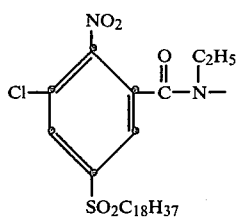

In a second embodiment of positive-working dye-release chemistry as referred to above, the ballasted carrier moiety or CAR in the above formulas may be a group having the formula:

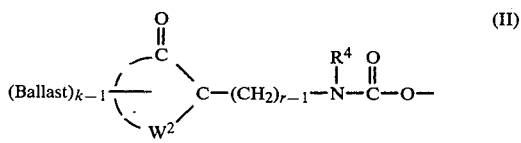

wherein:
Ballast is an organic ballasting radical of such molecular size and configuration as to render said compound nondiffusible in a photographic element during development in an alkaline processing composition;
$W^2$ represents at least the atoms necessary to complete a quinone nucleus (including various substituents thereon);
r is a positive integer of 1 or 2;
$R^4$ is an alkyl (including substituted alkyl) radical having 1 to about 40 carbon atoms or an aryl (including substituted aryl) radical having 6 to about 40 carbon atoms; and
k is a positive integer of 1 to 2 and is 2 when $R^4$ is a radical of less than 8 carbon atoms.

Examples of the CAR moiety in this formula (II) include the following:

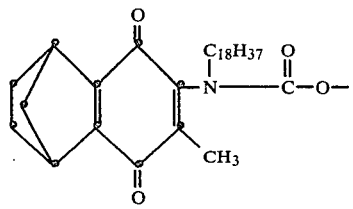

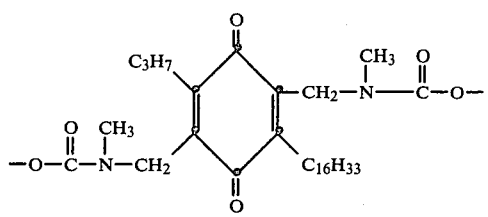

In using the compounds in formulas I and II above, they are employed in a photographic element similar to the other nondiffusible dye-releasers described previously. Upon reduction of the compound as a function of silver halide development under alkaline conditions, the metallizable azo dye is released. In this embodiment, conventional negative-working silver halide emulsions, as well as direct-positive emulsions, can be employed. For further details concerning these particular CAR moieties, including synthesis details, reference is made to U.S. Pat. No. 4,139,379 of Chasman et al., the disclosure of which is hereby incorporated by reference.

In a third embodiment of positive-working dye-release chemistry as referred to above, the ballasted carrier moiety or CAR in the above formulas may be a group having the formula:

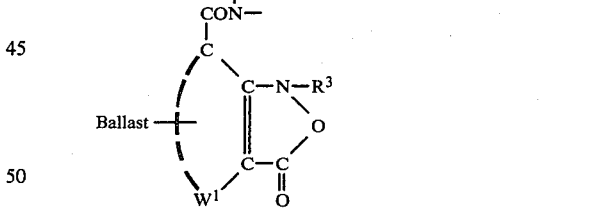

wherein: Ballast, $W^1$ and $R^3$ are as defined for formula (I) above.

Examples of the CAR moiety in this formula (III) include the following:

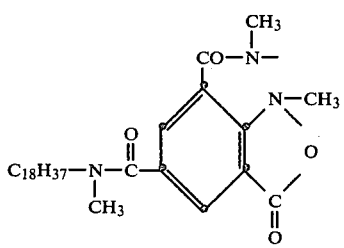

-continued

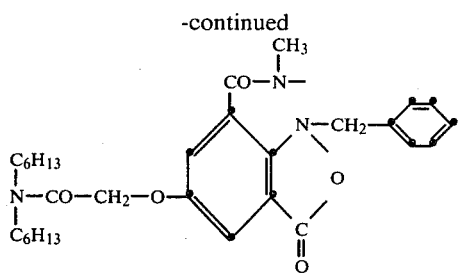

For further details concerning this particular CAR moiety, including synthesis details, reference is made to U.S. Pat. No. 4,199,354 of Hinshaw et al., the disclosure of which is hereby incorporated by reference.

In a fourth embodiment of positive-working dye-release chemistry as referred to above, the ballasted carrier moiety or CAR in the above formulas may be a group having the formula:

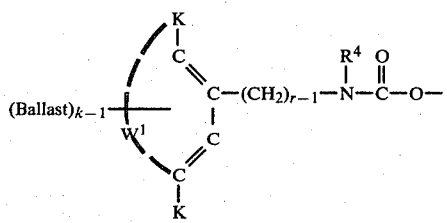
(IV)

wherein:
Ballast, r, $R^4$ and k are as defined for formula (II) above;
$W^1$ is as defined for formula (I) above; and
K is OH or a hydrolyzable precursor thereof.
Examples of the CAR moiety in this formula (IV) include the following:

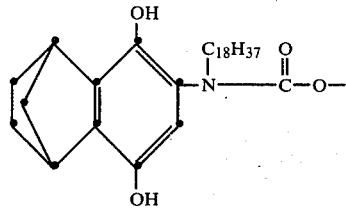

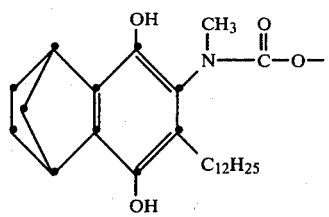

For further details concerning this particular CAR moiety, including synthesis details, reference is made to U.S. Pat. No. 3,980,479 of Fields et al., the disclosure of which is hereby incorporated by reference.

Representative compounds included within the scope of the invention include the following:

Compound 1

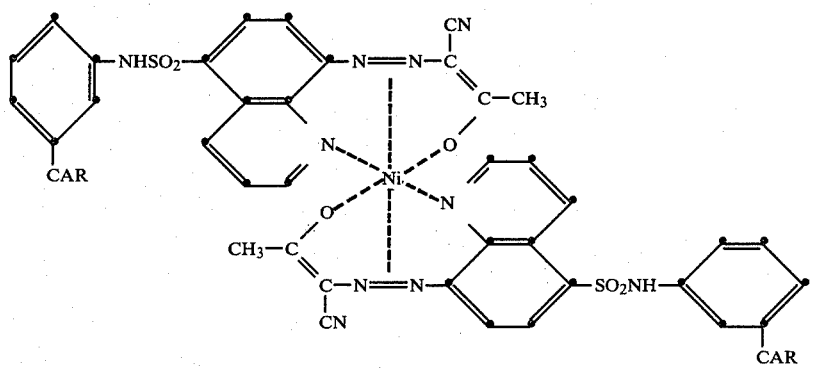

Compound 2

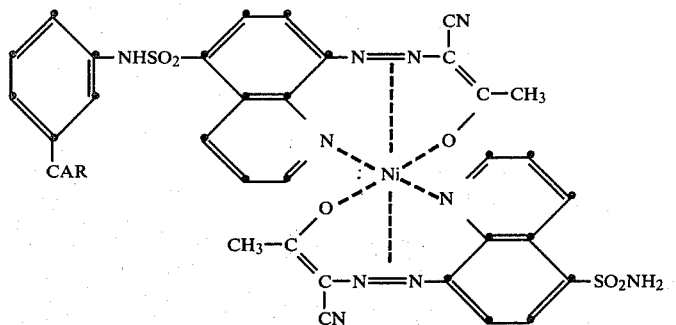

Compound 3

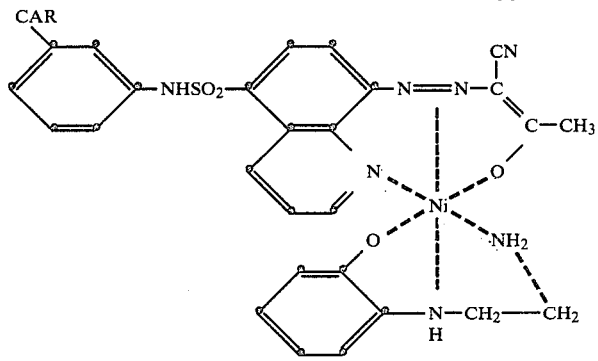
Compound 4
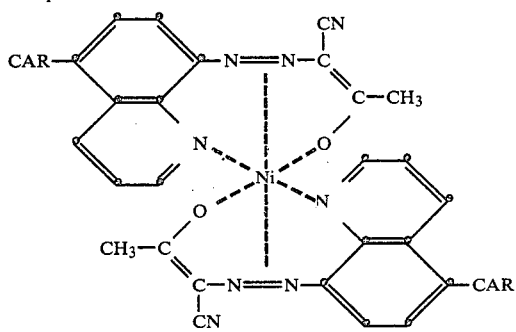
Compound 5
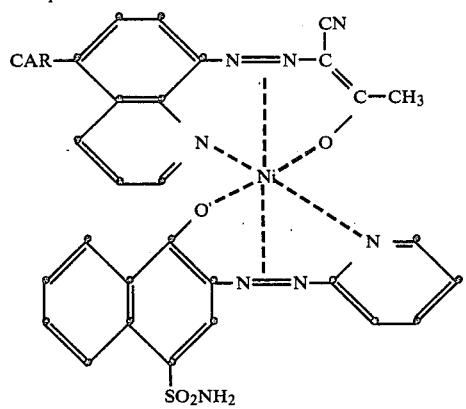
Compound 6
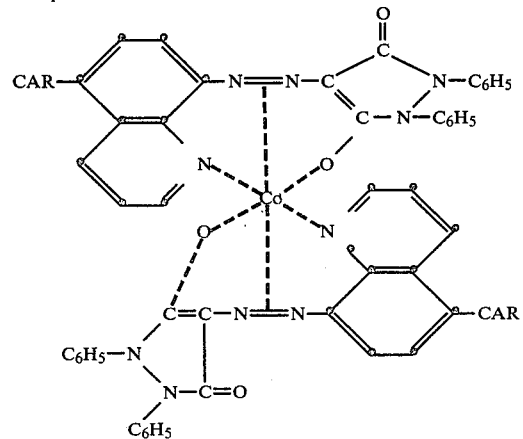
Compound 7

-continued
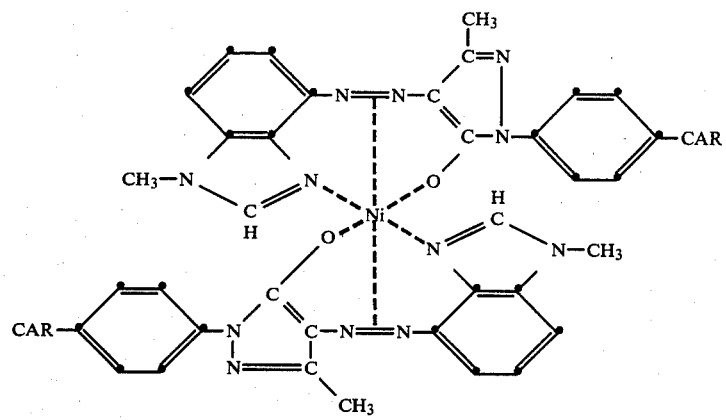
wherein CAR is
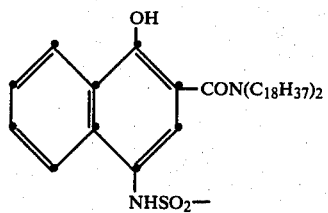
Compounds 8-9
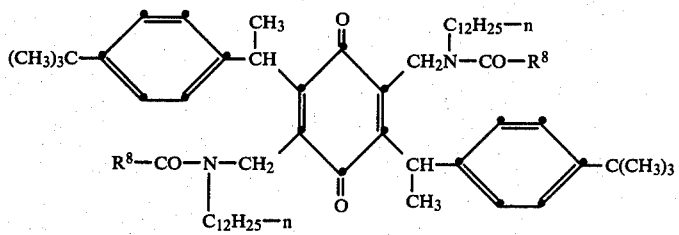
(8) wherein $R^8$ is
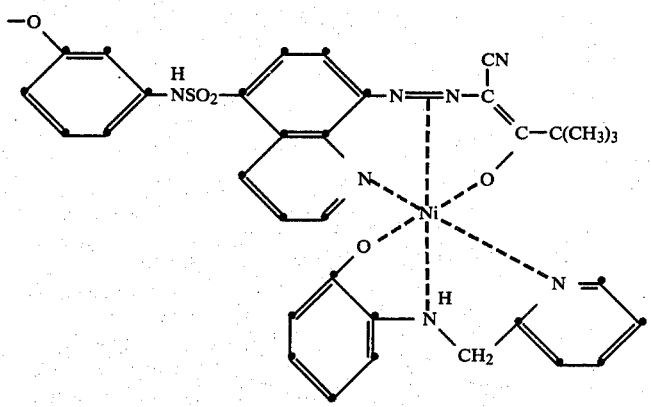
(9) wherein $R^8$ is -continued

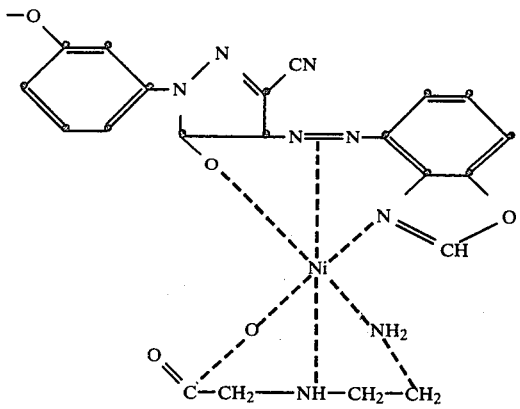

Compound 10

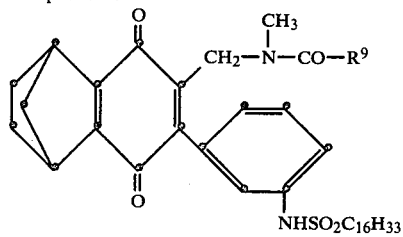

wherein R[9] is

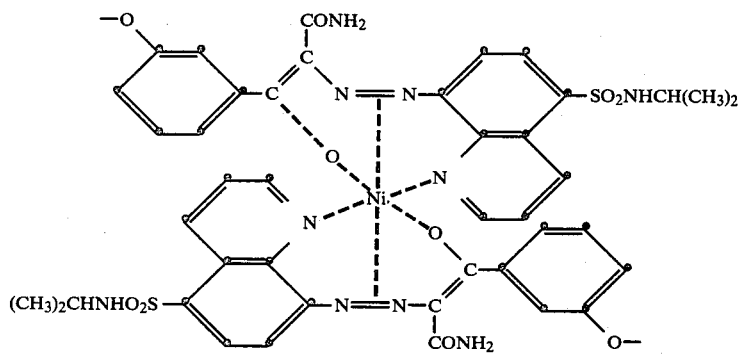

A process for producing a photographic transfer image in color according to the invention comprises:

(a) treating an imagewise-exposed photographic element as described above with an alkaline processing composition in the presence of a silver halide developing agent to effect development of each of the exposed silver halide emulsion layers;

(b) the dye-releasing compound then releasing the diffusible azo dye as described above imagewise as a function of the development of each of the silver halide emulsion layers; and (c) at least a portion of the imagewise distribution of the azo dye diffusing to a dye image-receiving layer to form a metal-complexed azo dye transfer image.

The above-described metal-complexed azo dye transfer image formed in the receiving layer usually contains a photographic mordant to bind the dye or coordination complex thereto. Thus, in another embodiment of the invention, there is provided a photographic element comprising a support having thereon a layer comprising a photographic mordant having bound thereto a coordination complex having the formula:

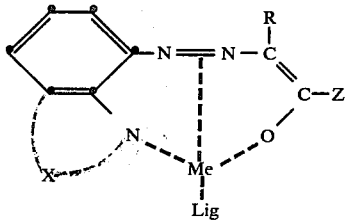

wherein X, Z, R, Lig and Me are as defined above.

The structure shown above may also, of course, be substituted in the same manner as described above for the starting compounds from which they are released.

It will be appreciated that, after processing the photographic element described above, there remains in it after transfer has taken place an imagewise distribution of azo dye in addition to developed silver. A color image comprising residual nondiffusible compound is obtained in this element if the residual silver and silver halide are removed by any conventional manner well known to those skilled in the photographic art, such as a bleach bath, followed by a fix bath, a bleach-fix bath, etc. The imagewise distribution of azo dye may also diffuse out of the element into these baths, if desired, rather than to an image-receiving element. If a negative-working silver halide emulsion is employed in certain preferred photosensitive elements, described above, then a positive color image, such as a reflection print, a color transparency or motion picture film, is produced in this manner. If a direct-positive silver halide emulsion is employed in such photosensitive elements, then a negative color image is produced.

The photographic element in the above-described process can be treated in any manner with an alkaline processing composition to effect or initiate development. A preferred method for applying processing composition is by use of a rupturable container or pod which contains the composition. In general, the processing composition employed in this invention contains the developing agent for development, although the composition could also just be an alkaline solution where the developer is incorporated in the photographic element, image-receiving element or process sheet, in which case the alkaline solution serves to activate the incorporated developer.

A photographic film unit or assemblage in accordance with this invention is adapted to be processed by an alkaline processing composition, and comprises:
 (1) a photographic element as described above; and
 (2) a dye image-receiving layer.
In this embodiment, the processing composition may be inserted into the film unit, such as by interjecting processing solution with communicating members similar to hypodermic syringes which are attached either to a camera or camera cartridge. The processing composition can also be applied by means of a swab or by dipping in a bath, if so desired. Another method of applying processing composition in a film assemblage which can be used in the invention is the liquid spreading means described in U.S. application Ser. No. 143,230 of Columbus, filed Apr. 24, 1980.

In a preferred embodiment of the invention, the assemblage itself contains the alkaline processing composition and means containing same for discharge within the film unit. There can be employed, for example, a rupturable container which is adapted to be positioned during processing of the film unit so that a compressive force applied to the container by pressure-applying members, such as would be found in a camera designed for in-camera processing, will effect a discharge of the container's contents within the film unit.

The dye image-receiving layer in the above-described film assemblage is optionally located on a separate support adapted to be superposed on the photographic element after exposure thereof. Such image-receiving elements are generally disclosed, for example, in U.S. Pat. No. 3,362,819. When the means for discharging the processing composition is a rupturable container, it is usually positioned in relation to the photographic element and the image-receiving element so that a compressive force applied to the container by pressure-applying members, such as would be found in a typical camera used for in-camera processing, will effect a discharge of the container's contents between the image-receiving element and the outermost layer of the photographic element. After processing, the dye image-receiving element is separated from the photographic element.

The dye image-receiving layer in the above-described film assemblage in another embodiment is located integrally with the photographic element between the support and the lowermost photosensitive silver halide emulsion layer. One useful format for integral receiver-negative photographic elements is disclosed in Belgian Pat. No. 757,960. In such an embodiment, the support for the photographic element is transparent and is coated with an image-receiving layer, a substantially opaque light-reflective layer, e.g., $TiO_2$, and then the photosensitive layer or layers described above. After exposure of the photographic element, a rupturable container containing an alkaline processing composition and an opaque process sheet are brought into superposed position. Pressure-applying members in the camera rupture the container and spread processing composition over the photographic element as the film unit is withdrawn from the camera. The processing composition develops each exposed silver halide emulsion layer and dye images are formed as a function of development which diffuse to the image-receiving layer to provide a positive, right-reading image which is viewed through the transparent support on the opaque reflecting layer background. For other details concerning the format of this particular integral film unit, reference is made to the above-mentioned Belgian Pat. No. 757,960.

Another format for integral negative-receiver photographic elements in which the present invention is useful is disclosed in Canadian Pat. No. 928,559. In this embodiment, the support for the photographic element is transparent and is coated with the image-receiving layer, a substantially opaque, light-reflective layer and the photosensitive layer or layers described above. A rupturable container containing an alkaline processing composition and an opacifier is positioned adjacent the top layer and a transparent top sheet which has thereon a neutralizing layer and a timing layer. The film unit is placed in a camera, exposed through the transparent top sheet and then passed through a pair of pressure-applying members in the camera as it is being removed therefrom. The pressure-applying members rupture the container and spread processing composition and opacifier over the negative portion of the film unit to render it light-insensitive. The processing composition develops each silver halide layer and dye images are formed as a result of development which diffuse to the image-receiving layer to provide a positive, right-reading image which is viewed through the transparent support on the opaque reflecting layer background. For further details concerning the format of this particular integral film unit, reference is made to the above-mentioned Canadian Pat. No. 928,559.

Still other useful integral formats in which this invention can be employed are described in U.S. Pat. Nos. 3,415,644; 3,415,645; 3,415,646; 3,647,437 and 3,635,707. In most of these formats, a photosensitive silver halide emulsion is coated on an opaque support and a dye image-receiving layer is located on a separate transparent support superposed over the layer outermost from the opaque support. In addition, this transparent support also preferably contains a neutralizing layer and a timing layer underneath the dye image-receiving layer.

In another embodiment of the invention, a neutralizing layer and timing layer are located underneath the photosensitive layer or layers. In that embodiment, the photographic element would comprise a support having thereon, in sequence, a neutralizing layer, a timing layer and at least one photosensitive silver halide emulsion layer having associated therewith a dye-releasing compound as described above. A dye image-receiving layer as described above would be provided on a second support with the processing composition being applied therebetween. This format could either be integral or peel-apart as described above.

Another embodiment of the invention uses the image-reversing technique disclosed in British Pat. No. 904,364, page 19, lines 1 through 41. In this process, the dye-releasing compounds are used in combination with physical development nuclei in a nuclei layer contiguous to the photosensitive silver halide emulsion layer. The film unit contains a silver halide solvent, preferably in a rupturable container with the alkaline processing composition.

The film unit or assembly used in the present invention is used to produce positive images in single- or multicolors. In a three-color system, each silver halide emulsion layer of the film assembly will have associated therewith a dye-releasing compound which releases a dye possessing a predominant spectral absorption within the region of the visible spectrum to which said silver halide emulsion is sensitive (initially or after forming the coordination complex), i.e., the blue-sensitive silver halide emulsion layer will have the yellow or yellow-forming dye-releaser of the invention associated therewith, the green-sensitive silver halide emulsion layer will have a magenta or magenta-forming dye-releaser associated therewith, and the red-sensitive silver halide emulsion layer will have a cyan or cyan-forming dye-releaser associated therewith. The dye-releaser associated with each silver halide emulsion layer is contained either in the silver halide emulsion layer itself or in a layer contiguous to the silver halide emulsion layer.

The concentration of the dye-releasing compounds that are employed in the present invention may be varied over a wide range, depending upon the particular compound employed and the results which are desired. For example, the dye-releasers of the present invention may be coated in layers at a concentration of about 0.1 to about 3 g/m$^2$ by using coating solutions containing between about 0.5 and about 8 percent by weight of the dye-releaser distributed in a hydrophilic film-forming natural material or synthetic polymer, such as gelatin, polyvinyl alcohol, etc., which is adapted to be permeated by aqueous alkaline processing composition.

Depending upon which CAR is used in the present invention, a variety of silver halide developing agents or electron transfer agents (ETA's) are useful in this invention. In certain embodiments of the invention, any ETA can be employed as long as it cross-oxidizes with the dye-releasers described herein. The ETA may also be incorporated in the photosensitive element to be activated by the alkaline processing composition. Specific examples of ETA's useful in this invention include hydroquinone compounds, such as hydroquinone, 2,5-dichlorohydroquinone or 2-chlorohydroquinone; aminophenol compounds, such as 4-aminophenol, N-methylaminophenol, N,N-dimethylaminophenol, 3-methyl-4-aminophenol or 3,5-dibromoaminophenol; catechol compounds, such as catechol, 4-cyclohexylcatechol, 3-methoxycatechol or 4-(N-octadecylamino)-catechol; and phenylenediamine compounds, such as N,N,-N',N'-tetramethyl-p-phenylenediamine. In highly preferred embodiments, the ETA is a 3-pyrazolidinone compound, such as 1-phenyl-3-pyrazolidinone (Phenidone), 1-phenyl-4,4-dimethyl-3-pyrazolidinone (Dimezone), 4-hydroxymethyl-4-methyl-1-phenyl-3-pyrazolidinone, 4-hydroxymethyl-4-methyl-1-p-tolyl-3-pyrazolidinone, 4-hydroxymethyl-4-methyl-1-(3,4-dimethylphenyl)-3-pyrazolidinone, 1-m-tolyl-3-pyrazolidinone, 1-p-tolyl-3-pyrazolidinone, 1-phenyl-4-methyl-3-pyrazolidinone, 1-phenyl-5-methyl-3-pyrazolidinone, 1-phenyl-4,4-dihydroxymethyl-3-pyrazolidinone, 1,4-dimethyl-3-pyrazolidinone, 4-methyl-3-pyrazolidinone, 4,4-dimethyl-3-pyrazolidinone, 1-(3-chlorophenyl)-4-methyl-3-pyrazolidinone, 1-(4-chlorophenyl)-4-methyl-3-pyrazolidinone, 1-(3-chlorophenyl)-3-pyrazolidinone, 1-(4-chlorophenyl)-3-pyrazolidinone, 1-(4-tolyl)-4-methyl-3-pyrazolidinone, 1-(2-tolyl)-4-methyl-3-pyrazolidinone, 1-(4-tolyl)-3-pyrazolidinone, 1-(3-tolyl)-3-pyrazolidinone, 1-(3-tolyl)-4,4-dimethyl-3-pyrazolidinone, 1-(2-trifluoroethyl)-4,4-dimethyl-3-pyrazolidinone or 5-methyl-3-pyrazolidinone. A combination of different ETA's, such as those disclosed in U.S. Pat. No. 3,039,869, can also be employed. These ETA's are employed in the liquid processing composition or contained, at least in part, in any layer or layers of the photographic element or film unit to be activated by the alkaline processing composition, such as in the silver halide emulsion layers, the dye image-providing material layers, interlayers, image-receiving layer, etc.

In a preferred embodiment of the invention, the silver halide developer or ETA employed in the process becomes oxidized upon development and reduces silver halide to silver metal. The oxidized developer than cross-oxidizes the dye-releasing compound. The product of cross-oxidation then undergoes alkaline hydrolysis, thus releasing an imagewise distribution of diffusible azo dye which then diffuses to the receiving layer to provide the dye image. The diffusible moiety is transferable in alkaline processing composition either by virtue of its self-diffusivity or by its having attached to it one or more solubilizing groups, for example, a carboxy, sulpho, sulphonamido, hydroxy or morpholino group.

In using the dye-releasing compounds according to the invention which produce diffusible dye images as a function of development, either conventional negative-working or direct-positive silver halide emulsions are employed. If the silver halide emulsion employed is a direct-positive silver halide emulsion, such as an internal-image emulsion designed for use in the internal image reversal process or a fogged, direct-positive emulsion such as a solarizing emulsion, which is developable in unexposed areas, a positive image can be obtained in certain embodiments on the dye image-receiving layer. After exposure of the film unit, the alkaline processing composition permeates the various layers to initiate development of the exposed photosensitive silver halide emulsion layers. The developing agent present in the film unit develops each of the silver halide emulsion layers in the unexposed areas (since the silver halide emulsions are direct-positive ones), thus causing the developing agent to become oxidized imagewise corresponding to the unexposed areas of the direct-positive silver halide emulsion layers. The oxidized developing agent then crossoxidizes the dye-releasing compounds and the oxidized form of the compounds then undergoes a base-catalyzed reaction to release the dyes imagewise as a function of the imagewise exposure of each of the silver halide emulsion layers. At least a portion of the imagewise distributions of diffusible dyes diffuse to the image-receiving layer to form a positive image of the original subject. After being contacted by the alkaline processing composition, a neutralizing layer in the film unit or image-receiving unit lowers the pH of the film unit or image receiver to stabilize the image.

Internal-image silver halide emulsions useful in this invention are described more fully in the November 1976 edition of *Research Disclosure*, pages 76 through 79, the disclosure of which is hereby incorporated by reference.

The various silver halide emulsion layers of a color film assembly employed in this invention are disposed in the usual order, i.e., the blue-sensitive silver halide emulsion layer first with respect to the exposure side, followed by the green-sensitive and red-sensitive silver halide emulsion layers. If desired, a yellow dye layer or a yellow colloidal silver layer can be present between the blue-sensitive and green-sensitive silver halide emulsion layers for absorbing or filtering blue radiation that is transmitted through the blue-sensitive layer. If desired, the selectively sensitized silver halide emulsion layers can be disposed in a different order, e.g., the blue-sensitive layer first with respect to the exposure side, followed by the red-sensitive and green-sensitive layers.

The rupturable container employed in certain embodiments of this invention is disclosed in U.S. Pat. Nos. 2,543,181; 2,643,886; 3,653,732; 2,723,051; 3,056,492; 3,056,491 and 3,152,515. In general, such containers comprise a rectangular sheet of fluid- and air-impervious material folded longitudinally upon itself to form two walls which are sealed to one another along their longitudinal and end margins to form a cavity in which processing solution is contained.

Generally speaking, except where noted otherwise, the silver halide emulsion layers employed in the invention comprise photosensitive silver halide dispersed in gelatin and are about 0.6 to 6 microns in thickness; the dye-releasers are dispersed in an aqueous alkaline solution-permeable polymeric binder, such as gelatin, as a separate layer about 0.2 to 7 microns in thickness; and the alkaline solution-permeable polymeric interlayers, e.g., gelatin, are about 0.2 to 5 microns in thickness. Of course, these thicknesses are approximate only and can be modified according to the product desired.

Scavengers for oxidized developing agent can be employed in various interlayers of the photographic elements of the invention. Suitable materials are disclosed on page 83 of the November 1976 edition of *Research Disclosure*, the disclosure of which is hereby incorporated by reference.

Any material is useful as the image-receiving layer in this invention as long as the desired function of mordanting or otherwise fixing the dye images is obtained. The particular material chosen will, of course, depend upon the dye to be mordanted. Suitable materials are disclosed on pages 80 through 82 of the November 1976 edition of *Research Disclosure*, the disclosure of which is hereby incorporated by reference.

Use of a neutralizing material in the film units employed in this invention will usually increase the stability of the transferred image. Generally, the neutralizing material will effect a reduction in the pH of the image layer from about 13 or 14 to at least 11 and preferably 5 to 8 within a short time after imbibition. Suitable materials and their functioning are disclosed on pages 22 and 23 of the July 1974 edition of *Research Disclosure*, and pages 35 through 37 of the July 1975 edition of *Research Disclosure*, the disclosures of which are hereby incorporated by reference.

A timing or inert spacer layer can be employed in the practice of this invention over the neutralizing layer which "times" or controls the pH reduction as a function of the rate at which alkali diffuses through the inert spacer layer. Examples of such timing layers and their functioning are disclosed in the *Research Disclosure* articles mentioned in the paragraph above concerning neutralizing layers.

The alkaline processing composition employed in this invention is the conventional aqueous solution of an alkaline material, e.g., alkali metal hydroxides or carbonates such as sodium hydroxide, sodium carbonate or an amine such as diethylamine, preferably possessing a pH in excess of 11, and preferably containing a developing agent as described previously. Suitable materials and addenda frequently added to such compositions are disclosed on pages 79 and 80 of the November 1976 edition of *Research Disclosure*, the disclosure of which is hereby incorporated by reference.

The alkaline solution-permeable, substantially opaque, light-reflective layer employed in certain embodiments of photographic film units used in this invention is described more fully in the November 1976 edition of *Research Disclosure*, page 82, the disclosure of which is hereby incorporated by reference.

The supports for the photographic elements used in this invention can be any material as long as it does not deleteriously affect the photographic properties of the film unit and is dimensionally stable. Typical flexible sheet materials are described on page 85 of the November 1976 edition of *Research Disclosure*, the disclosure of which is hereby incorporated by reference.

While the invention has been described with reference to layers of silver halide emulsions and dye image-providing materials, dotwise coating, such as would be obtained using a gravure printing technique, could also be employed. In this technique, small dots of blue-, green- and red-sensitive emulsions have associated therewith, respectively, dots of yellow, magenta and cyan color-providing substances. After development, the transferred dyes would tend to fuse together into a continuous tone. In an alternative embodiment, the emulsions sensitive to each of the three primary regions of the spectrum can be disposed as a single segmented layer, e.g., as by the use of microvessels, as described in Whitmore U.S. patent application Ser. No. 184,714, filed Sept. 8, 1980.

The silver halide emulsions useful in this invention, both negative-working and direct-positive ones, are well known to those skilled in the art and are described in *Research Disclosure*, Volume 176, December 1978, Item No. 17643, pages 22 and 23, "Emulsion preparation and types"; they are usually chemically and spectrally sensitized as described on page 23, "Chemical sensitization", and "Spectral sensitization and desensitization", of the above article; they are optionally protected against the production of fog and stabilized against loss of sensitivity during keeping by employing the materials described on pages 24 and 25, "Antifoggants and stabilizers", of the above article; they usually contain hardeners and coating aids as described on page 26, "Hardeners", and pages 26 and 27, "Coating aids", of the above article; they and other layers in the photographic elements used in this invention usually contain plasticizers, vehicles and filter dyes described on page 27, "Plasticizers and lubricants"; page 26, "Vehicles and vehicle extenders"; and pages 25 and 26, "Absorbing and scattering materials", of the above article; they and other layers in the photographic elements used in this invention can contain addenda which are incorporated by using the procedures described on page 27, "Methods of addition", of the above article; and they are usually coated and dried by using the various techniques described on pages 27 and 28, "Coating and drying procedures", of the above article, the disclosures of which are hereby incorporated by reference.

The term "nondiffusing" used herein has the meaning commonly applied to the term in photography and denotes materials that, for all practical purposes, do not migrate or wander through organic colloid layers, such as gelatin, in the photographic elements of the invention in an alkaline medium and preferably when processed in a medium having a pH of 11 or greater. The same meaning is to be attached to the term "immobile". The term "diffusible" as applied to the materials of this invention has the converse meaning and denotes materials having the property of diffusing effectively through the colloid layers of the photographic elements in an alkaline medium. "Mobile" has the same meaning as "diffusible".

The term "associated therewith" as used herein is intended to mean that the materials can be in either the same or different layers, so long as the materials are accessible to one another.

The following examples are provided to further illustrate the invention.

EXAMPLE 1

Released Dyes—Spectra, Light Stability and Dye Diffusion Tests

A receiving element was prepared comprising a poly(ethylene terephthalate) film support having thereon a nickel sulfate hexahydrate (0.58 g/m$^2$)/gelatin (1.08 g/m$^2$) metal complexing layer, and a poly(4-vinylpyridine)/gelatin mordant layer (each at 2.15 g/m$^2$), which forms metal complexes with the unmetallized dyes.

An alternative receiving element was used with the premetallized dye-complexes. It comprised a poly(ethylene terephthalate) film support having thereon a layer of gelatin (1.1 g/m$^2$) and a cationic mordant layer of poly(styrene-co-1-vinylimidazole-co-3-benzyl-1-vinylimidazolium chloride (50:40:10) (4.5 g/m$^2$) and gelatin (2.2 g/m$^2$).

The appropriate receiving element was immersed in an alkaline solution of the azo dyes listed in Table I below. The receiver was removed from the dye solution, washed in distilled water, placed in a pH 7.0 buffer solution and dried. Transmission spectra obtained on each sample of the mordanted dyes were normalized by computer to a density of 1.0. The characteristic wavelength of the dye, $\lambda_{\frac{1}{2}}$ in nm, is the mean of the wavelength limits of the absorption envelope at half the maximum density. The HBW ("half band width") in nm is the range or distance between those limits. The dye solution spectrum in 3:1 dioxane:water at pH 7 in the presence of excess nickel ion is also given.

The above receiving elements at pH 7 were then subjected to 10 days irradiation by a high intensity daylight (HID), 6000 W Xenon arc lamp, the sample receiving 50,000 lux through a Wratten 2B (ultraviolet) filter at approximately 38° C. and low humidity. The percent fade represents the loss in density at $\lambda_{max}$ after irradiation.

Dye Diffusion Tests

The released dyes in Table I were also subjected to the conditions of two different dye diffusion tests. One, the "solution test" involved dissolving the dye in a viscous composition and transferring it through a receiving element which contains an opaque and reflecting layer in addition to the mordant layer. The other, a "gel pad test" involved imbibing the dye from solution into a thick gelatin layer, and then transferring it by direct lamination to the same receiving element which had been preswollen by soaking 5 minutes in a solution of 0.1 potassium hydroxide. The receiver for these tests had the following composition (coverages are parenthetically given in g/m$^2$):

A transparent poly(ethylene terephthalate) film support coated with (1) a mordant layer of poly(styrene-co-N-vinylbenzyl-N-benzyl-N,N-dimethylammonium chloride-co-divinylbenzene) (2.28) and gelatin (2.28);

(2) an opaque and reflecting layer of carbon black (1.88) in gelatin (1.23) and titanium dioxide (16.1) in gelatin (2.63); and (3) an overcoat layer of gelatin (4.3).

Solution Test

Approximately 0.075 mmol of the released dye was dissolved in 10 ml of 0.125 N potassium hydroxide. After the dye was completely dissolved, 20 ml of a viscous composition was added; and the resulting solution, stirred for at least 20 minutes, was 0.0025 M in dye at a pH of 13.4. The viscous composition was prepared from 46.2 g potassium hydroxide and 54 g carboxymethylcellulose dissolved in 1200 ml water. The dye solution was then spread between the receiver and a clear polyester cover sheet between spaced rollers so that the gap containing the viscous solution had a thickness of 102 μm. Measurement of the rate of dye diffusion was commenced at the point at which half of the laminate had passed through the rollers. The appearance of dye on the mordant was measured at $\lambda_{max}$ as diffuse reflection density vs. time. The reflection density was converted to transmission density by computer with the aid of a mathematical relation derived from a previous calibration. A plot of transmission density, which is proportional to concentration vs. time, was derived; and the value of $t-\frac{1}{2}$ of dye transfer, the time in seconds required to obtain one-half of the maximum transmission density, calculated.

Gel Pad Test

A donor element, containing a thick pad of deionized acid-processed gelatin (26 g/m$^2$) hardened with 2 percent bis(vinylsulfonylmethyl)ether, was imbibed with a solution of 0.1 M in potassium hydroxide and $1.3 \times 10^{-3}$ M in dye. The pad was soaked to full penetration, surface wiped, and then laminated in direct contact to the above receiving element which had been presoaked for 5 minutes at 0.1 M KOH. The $t-\frac{1}{2}$ of dye transfer was obtained as in the solution test. The diffusion times by the "gel pad test" are substantially longer than by the "solution test". The results obtained are shown in Table I.

TABLE I

Released Dyes $$E \underset{N}{-\text{benzene-naphthyl}-} N=N-\underset{HO-C-Z}{\overset{C-R}{\|}}$$

| Cmpd. | Z | R | E | Spectra of Ni—Dye Complexes | | | | | Dye Diffusion $t_{\frac{1}{2}}$ (sec) | |
|---|---|---|---|---|---|---|---|---|---|---|
| | | | | Dye Solution | | Mordant | | | | |
| | | | | $\lambda_{\frac{1}{2}}$ (nm) | HBW (nm) | $\lambda_{\frac{1}{2}}$ (nm) | HBW (nm) | % Fade | Soln. | Gel Pad |
| A | $CH_3$ | CN | H | 431 | 68 | — | — | — | — | — |
| B | $CH_3$ | CN | $SO_2NH_2$ | 445 | 67 | 456 | 70 | 1.5 | 27 | — |
| *B' | $CH_3$ | CN | $SO_2NH_2$ | 452 | 68 | 453 | 76 | 16.7 | 39 | 151 |
| C | $CH_3$ | CN | $SO_2NH-m-C_6H_4-SO_2NH_2$ | 448 | 70 | 457 | 74 | 1.0 | 37 | — |
| *C' | $CH_3$ | CN | $SO_2NH-m-C_6H_4-SO_2NH_2$ | 458 | 70 | 455 | 84 | 17.7 | — | 327 |
| D | $CH_3$ | CN | $SO_2NH-m-C_6H_4OH$ | 451 | 70 | 459 | 73 | 8.0 | 39 | — |
| E | $(CH_3)_3C$ | CN | $SO_2NH_2$ | 445 | 72 | 456 | 69 | 2.0 | 29 | — |
| F | $C_6H_5$ | CN | H | 446 | 70 | 458 | 75 | 2.0 | — | — |
| G | $C_6H_5$ | CN | $SO_2NH_2$ | 460 | 70 | 470 | 75 | 1.0 | 27 | — |
| H | $(CH_3)_3C$ | CN | $SO_2NH-m-C_6H_4-SO_2NH_2$ | 450 | 70 | 455 | 79 | 3.6 | 40 | — |
| I | $CH_3$ | CN | $SO_2NH-m-C_6H_4-COOH$ | 451 | 68 | 455 | 77 | 7.2 | 34 | 127 |
| *I' | $CH_3$ | CN | $SO_2NH-m-C_6H_4-COOH$ | 456 | 68 | 457 | 82 | 10.1 | — | 424 |
| J | $CH_3$ | CN | $SO_2NH-m-C_6H_4-SO_3K$ | 451 | 68 | 454 | 75 | 3.6 | 34 | 136 |
| *J' | $CH_3$ | CN | $SO_2NH-m-C_6H_4-SO_3K$ | 456 | 69 | 454 | 82 | 18.2 | — | 448 |
| K | $CH_3$ | CN | $SO_2N(CH_2CH_2OH)_2$ | 450 | 65 | 457 | 70 | — | 29 | — |
| L | $-NC_6H_5-NC_6H_5-CO-$ | | H | 435 | 72 | 439 | 77 | 1.0 | — | — |
| M | $-NC_6H_5-NC_6H_5-CO-$ | | $SO_2NH_2$ | 450 | 72 | 459 | 77 | 1.0 | — | — |
| N | $-NC_6H_5-N-C(CH_3)-$ | | H | 444 | 102 | 447 | 116 | 3.0 | — | — |
| O | $-o-C_6H_4-O-CO-$ | | H | 429 | 98 | 452 | 85 | 0.0 | — | — |

*premetallized 2:1 Dye:Nickel$^{++}$ complex, alternative receiving element

EXAMPLE 2

Photographic Test

A photographic element was prepared by coating the following layers in the order recited on a transparent poly(ethylene terephthalate) film support. Coverages are parenthetically given in g/m² unless otherwise stated.

(1) DRR layer of compounds identified in Table 2 below (2.2×10⁻⁴ moles/m²) in ½ its weight of diethyllauramide, potassium 5-s-octadecylhydroquinone-2-sulfonate (0.022) and a blocked developing agent 1-phenyl-2-pyrazolin-3-yl-N-methyl-N-[2-(N-methyl-trifuloroacetamidomethyl)-4-(p-sulfonamido)phenyl]-carbamate (0.54) in gelatin (2.8);

(2) Green-sensitized silver chloride emulsion (0.39) in deionized gelatin (0.86), 1-(m-acetamidophenyl-2-tetrazoline-5-thione (350 mg/mole Ag), and octadecylquinone (5 g/mole Ag); and (3) overcoat layer of 2,5-di-s-dodecylhydroquinone (0.32) in deionized gelatin (0.54).

A receiving element was prepared by coating a mordant layer of a mixture of poly(N-vinylimidazole) (1.6 g/m²) and gelatin (1.6 g/m²) coated over a gelatin layer (0.81 g/m²) on a polyethylene-coated paper support. The photographic element was given a full exposure to $D_{max}$, then soaked for 15 seconds in an activator containing per liter of developer: 33.7 g potassium hydroxide, 2.0 g potassium bromide, 3.0 g 5-methylbenzotriazole, and 2.0 g 11-aminoundecanoic acid. The photographic element was then laminated to the receiver. The laminate was then cut into four pieces and placed on a constant temperature (24° C.) block. The four receiver pieces were peeled off after 1, 3, 5 and 10 minutes, each dried and the Status A density recorded. The access time, taken as the first of the strips to achieve a constant density on the receiver, was measured as follows:

TABLE 2

| Released Dye (Table 1) | RDR Compound | Access Time (min) | $D_{max}$ |
|---|---|---|---|
| B' | 4 | 3 | 1.51 |
| C' | 1 | 3 | 1.53 |

EXAMPLE 3

Synthesis of RDR Compound 1

To a 1 liter round-bottom flask was charged 350 ml THF and 35.0 g (0.0301 mole) of RDR Compound X (see below) under a nitrogen atomosphere. To this stirred solution was added 100 ml absolute ethanol and, slowly, 3.74 g (0.01505 mole) nickel acetate [Ni-(OAc)₂.4H₂O] dissolved in 20 ml water. The solution was stirred overnight at room temperature under nitrogen. The reaction mixture was heated at reflux for 8 hours, causing the conversion of unreacted material (identified by thin layer chromatography) into the 2:1 complex. The reaction mixture was then concentrated to less than ½ volume in vacuo and chilled to deposit a dark brown oil. As much as possible of the supernatant liquid was decanted, ca. 100 ml acetonitrile added and the oil worked with a spatula which led to partial solidification of the oil. This procedure was repeated until the mass of crude product had largely solidified at which time the product was filtered and air dried.

Some 1:1 complex still present was readily removed by dissolving the crude product in a minimum amount (ca. 250 ml) ether and passing through a 6″×6″ (diameter X height) pad of dry (unsolvated) Woelm silica gel, and washing with ether until all of the product had eluted. The ether solution was then brought to a boil, 500 ml acetonitrile CH$_3$CN added and the volume reduced to ca. 700 ml. The resultant cloudy solution was chilled overnight at 5°–10° C. and the resultant amorphous solid isolated by filtration. Yield 31.0 g, $\epsilon$(3:1 dioxane-H$_2$O)=5.76×10$^4$.

EXAMPLE 4

Synthesis of RDR Compound 2

This mixed 2:1 dye to nickel complex was prepared from the diaquo-acetato 1:1 RDR Compound Q below. The 1:1 complex (2.0 g, 1.52 mmole) and the released dye, Compound C (0.74 g, 1.57 mmole), were dissolved in 20 ml tetrahydrofuran and 0.5 ml glacial acetic acid and stirred 48 hours at room temperature. After evaporation of solvent, the crude product was chromatographed on silica gel, eluting with ether. The appropriate fractions were combined and rechromatographed on silica gel, eluting with dichloromethane/acetic acid (gradient from 100:0→80:20). The appropriate fractions were combined, the solvent evaporated and the residue recrystallized from dichloromethane to yield 0.85 g of the desired product as a yellow-brown powder. $\epsilon^{460}$=5.72 (3:1 dioxane-pH 6 buffer).

Analysis: Calculated: (C$_{85}$H$_{109}$N$_{13}$O$_{12}$S$_4$Ni)—%C=60.3, H=6.4, N=10.8, Ni=3.4. Found: %C=60.0, H=6.4, N=10.9, Ni=3.4.

INTERMEDIATES

Synthesis of 1:1 Nickel Complexed RDR Compound Q

A solution of 10.4 g (0.0418 m) nickel acetate tetrahydrate in 40 ml water was diluted with 200 ml ethanol and 100 ml tetrahydrofuran. A previously prepared solution of 4.85 g (0.00417 m) RDR Compound X in 75 ml tetrahydrofuran was added to the nickel acetate solution dropwise over 20 minutes. The reaction mixture was stirred at room temperature under a nitrogen atmosphere for 48 hours, concentrated in vacuo to approximately ½ volume and diluted with 500 ml ethyl ether. The resulting solution was extracted five times with 50 ml water, dried (MgSO$_4$) and concentrated to 50 ml. The crude product was a mixture of the desired 1:1 complex and the corresponding 1:2 (Ni:RDR) complex at this point. Purification was effected by chromatography on silica gel, eluting, first with ether, followed by a gradual change to THF:ether (2:3). The 1:2 complex (1.0 g) eluted first, followed by the desired 1:1 complex (2.5 g), which was isolated as a yellow-brown amorphous solid. $\epsilon$=2.39×10$^4$ (3:1 dioxane-pH 6 buffer).

Analysis: Calculated: (C$_{68}$H$_{101}$N$_7$O$_{11}$S$_2$Ni)—%C=62.1, H=7.7, N=7.5, Ni=4.4. Found: %C=64.7, H=8.2, N=8.2, Ni=4.4.

Synthesis of RDR Compound X

Under a blanket of nitrogen, 4.31 g (0.005 m) of 4-m-aminobenzenesulfonamido-N,N-dioctadecyl-1-hydroxy-2-naphthamide was dissolved in 25 ml tetrahydrofuran (THF). To this solution was added 1.77 g (0.00525 m) of 2-(5-chlorosulfonyl-8-quinolylhydrazono)acetoacetonitrile and 0.79 g (0.01 m) pyridine. The reaction mixture (nonhomogeneous) was stirred at room temperature for 20 hours and at 45°–55° C. for an additional 20 hours. The THF was removed in vacuo and the residue partitioned between 25 ml ca. 0.6 N hydrochloric acid and 50 ml ethyl acetate. The layers were separated and the organic phase washed three times with 15 ml 10 percent hydrochloric acid and three times with 10 ml water. The ethyl acetate solution was dried (MgSO$_4$), passed through a short (¼″) silica gel pad and evaporated to yield a greenish-orange oil. This crude product was crystallized three times from methanol (300 ml), chromatographed (silica gel, ether-pentane) and crystallized from methanol. Yield 1.5 g yellow powder $\epsilon^{455}$ (pyridine+Ni$^{2+}$)=2.7×10$^4$.

INTERMEDIATES

A.

2-(5-Chlorosulfonyl-8-quinolylhydrazono)acetoaceto nitrile

To a 250 ml round-bottom flask fitted with calcium sulfate drying tube was added 4.5 g (0.0126 m) of 2-(5-sulfo-8-quinolylhydrazono)acetoacetonitrile, potassium salt and 45 ml phosphorus oxychloride. The resultant slurry was chilled to <5° C. and 4.5 ml N-methylpyrrolidinone was slowly added. After stirring 1 hour. at 0°–5° C., the slurry was stirred overnight at room temperature followed by quenching in 500 ml ice water. The resultant yellow solid was collected, air dried and recrystallized from 100 ml acetonitrile. Yield 3.0 g yellow needles (70 percent).

B. 2-(5-Sulfo-8-quinolylhydrazono)acetoaceto nitrile, potassium salt

A slurry of 1.1 g (0.005 m) 8-amino-5-quinolinesulfonic acid in 20 ml water and 10 ml ethanol was treated with 2 ml concentrated hydrochloric acid and chilled to <5° C. To this yellow-orange slurry was added, slowly and dropwise, 5.0 ml of a 1 M sodium nitrite solution. After stirring for 15 minutes at 0°–5° C., the colorless slurry was added slowly to a solution of 0.8 g (0.0075 m) of the sodium salt of cyanoacetone in 30 ml water containing ca. 2 g of triethanolamine at 0°–5° C. Additional triethanolamine was added during the addition to maintain a pH of ≃8. After stirring at 0°–10° C. for 1 hour, the reaction was acidified with 5 ml glacial acetic acid and diluted with ca. 50 ml saturated KCl. After sitting at 0°–5° C. for 2 hours the slurry was filtered and the crude product recrystallized from ca. 75 ml 0.2 M KCl. The yield was 1.0 g (56 percent), $\epsilon^{440}$=2.72×10$^4$ (1:1 Dioxane-H$_2$O+Ni$^{2+}$).

C. 8-Amino-5-quinolinesulfonic acid

To a 2-liter, 3-necked round bottomed flask fitted with a reflux condenser were charged 97.2 g (0.4 mole) 8-hydroxy-5-quinolinesulfonic acid, sodium bisulfite (83.2 g, 0.8 mole), 400 ml distilled water and 200 ml concentrated aqueous ammonia. The resulting slurry was heated at reflux for 88 hours during which time the reaction mixture became a clear orange solution. After cooling to room temperature, the reaction was acidified (20 ml conc. hydrochloric acid), chilled and filtered. An additional 10 ml conc. hydrochloric acid was added to the filtrate which was chilled and filtered. The combined air dried filter cakes were dissolved in 300 ml pyridine, chilled in an ice bath and 60 ml acetic anhydride added dropwise. The solid which slowly precipitated following the addition was isolated by filtration, washed with cold pyridine and THF and air dried to yield 48.8 g (35 percent) of pyridinium 8-acetamido-5-quinolinesulfonate.

In a 250 ml 1-neck round-bottomed flask fitted with a reflux condenser was placed 25.0 g (0.0724 m) of the pyridinium 8-acetamido-5-quinolinesulfonate and 30 ml water. The slurry was heated to effect solution, 30 ml concentrated hydrochloric acid added and the mixture heated to reflux for 1 hour with stirring. A thick crystalline mass separated during the heating period. The thick slurry was then chilled to 0°–5° C. for several hours, filtered and washed with cold 6 N hydrochloric acid and THF. The yield was 11.3 g (70 percent) of product as off-white needles.

EXAMPLE 5

Comparison with the Prior Art

In U.S. Pat. No. 4,148,643, Compound J in column 32 is the nickel complex of the following dye compound:

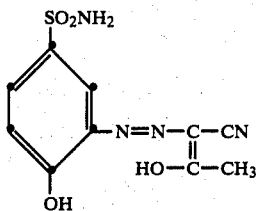

The nickel-dye complex is listed as having a $\lambda_{max}$ of 462 nm and a half-band width of 76 nm when adsorbed to a cationic polymeric mordant on a film strip. A 1:1 dioxane/water mixture at a pH of 7.0 of this nickel-dye complex was prepared. It absorbed at 444 nm in the presence of excess nickel ions and 402 nm in the absence of nickel ions.

In Table I, Compound C has the following structure:

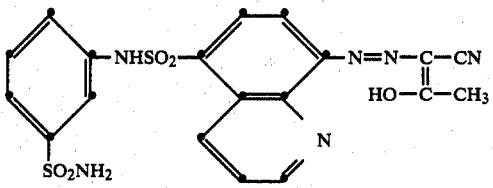

The compound has a quinoline nitrogen chelating group instead of a hydroxyl chelating group as in Compound J of U.S. Pat. No. 4,148,643. A 1:1 dioxane/water mixture at a pH of 7.0 of the above Compound C was prepared. It absorbed at 452 nm in the presence of excess nickel ions and at 387 nm in the absence of nickel ions.

When the nickel ion concentration was reduced to one-half the molar concentration of the dye, Dye C showed no change in the spectrum, while Compound J of U.S. Pat. No. 4,148,643 had a broad spectrum with a peak at about 418 nm.

The spectrum of Dye C in 0.5 mol Ni++ appears to be a stable 2:1 complex of dye to metal, while the spectrum of Compound J of U.S. Pat. No. 4,148,643 appears to be a mixture of nickel complex and unmetallized dye ligand. The spectral evidence thus shows that Dye C forms a much more stable 2:1 dye:nickel complex than compound J of U.S. Pat. No. 4,148,643.

The spectral and diffusion data for Compound C′, the 2:1 dye:nickel complex of Compound C, is shown in Table I. However, efforts to prepare a similar 2:1 complex of compound J of U.S. Pat. No. 4,148,643 failed. Only a 1:1 complex could be prepared.

When the unmetallized dye ligand of Compound J of U.S. Pat. No. 4,148,643 and the 1:1 complex thereof were subjected to the gel pad diffusion test as described in Example 1, the values obtained were 66 sec. and 146 sec., respectively. The spectrum of the dyes on the receiver was measured and in both instances, however, showed the presence of the unmetallized dye only. The 1:1 dye:nickel complex of Compound J of U.S. Pat. No. 4,148,643 decomposed under the conditions of transfer. Compound C′ of the invention, however, underwent no demetallization nor breakdown of the dye:metal complex under the same conditions of transfer.

The invention has been described in detail with particular reference to preferred embodiments thereof, but it will be understood that variations and modifications can be effected within the spirit and scope of the invention.

What is claimed is:

1. In a photographic element comprising a support having thereon at least one photosensitive silver halide emulsion layer, said emulsion layer having associated therewith a dye image-providing material, the improvement wherein said dye image-providing material is a nondiffusible compound having at least one releasable yellow dye moiety or precursor thereof, said compound having the formula:

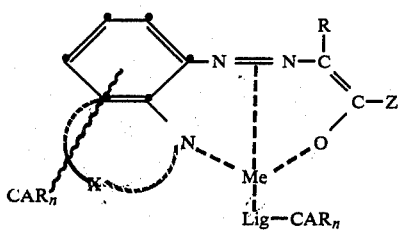

wherein:
(a) X represents the atoms necessary to complete a 5- or 6-membered aromatic heterocyclic fused ring;
(b) Z represents alkyl, substituted alkyl, aryl or substituted aryl;
(c) R represents CN or J—L;
(d) J represents a bivalent

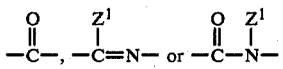

group;
(e) L represents alkyl, substituted alkyl, aryl, substituted aryl, or can be taken together with Z to complete a carbonyl-containing 5- or 6-membered heterocyclic or carbocyclic ring;
(f) $Z^1$ represents the same groups as Z;
(g) each CAR independently represents a ballasted carrier moiety capable of releasing said diffusible yellow dye moiety or precursor thereof as a function of development of said silver halide emulsion layer under alkaline conditions;
(h) each n is 0 or 1, with the proviso that at least one n is 1;
(i) Lig is a monoanionic tridentate ligand; and
(j) Me is a polyvalent, hexacoordinate metal ion.

2. The photographic element of claim 1 wherein said Me is either zinc(II), nickel(II), copper(II), cobalt(II), cobalt(III), platinum(II), palladium(II) or chromium(III).

3. The photographic element of claim 1 wherein said Me is nickel(II).

4. The photographic element of claim 1 wherein said Lig is selected from the group consisting of o-(2-aminoethylamino)phenol, o-(2-pyridylmethylamino)phenol, N-(2-aminoethyl)glycine, N-(2-pyridylmethylamino)glycine, N-(3-hydroxyl-2-pyridylmethylamino)glycine, 2-aminomethyl-1-methyl-4-imidazolecarboxylic acid, and tridentate dye moieties.

5. The photographic element of claim 1 wherein said Lig is a monomeric tridentate dye moiety such that the resulting nondiffusible compound has the following formula:

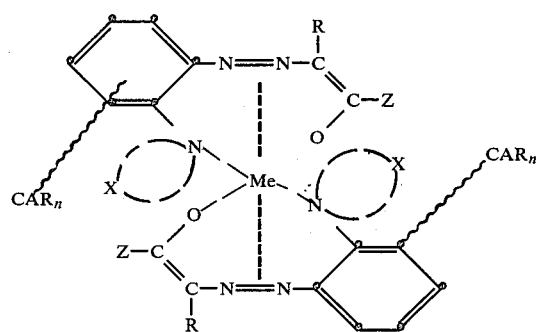

wherein each X, Z, R, CAR, n, and Me is defined as in claim 1.

6. The photographic element of claim 1 wherein X represents the atoms necessary to complete a quinoline, quinoxaline or benzimidazole ring.

7. The photographic element of claim 1 wherein X represents the atoms necessary to complete a quinoline ring, Z is alkyl and R is CN.

8. The photographic element of claim 7 wherein a CAR is attached to the 5-position of the quinoline ring.

9. The photographic element of claim 1 wherein CAR is a group having the formula:

(Ballast—Carrier—Link)— wherein:
(a) Ballast is an organic ballasting radical of such molecular size and configuration as to render said compound nondiffusible in said photographic element during development in an alkaline processing composition;
(b) Carrier is an oxidizable acyclic, carbocyclic or heterocyclic moiety; and
(c) Link represents a group which, upon oxidation of said carrier moiety, is capable of being hydrolytically cleaved to release said diffusible dye.

10. The photographic element of claim 9 wherein the carrier moiety contains atoms according to the following configuration:

a(—C=C)$_b$— wherein:
b is a positive integer of 1 to 2; and
a represents the radicals OH, SH, NH—, or hydrolyzable precursors thereof.

11. The photographic element of claim 1 wherein CAR is a group having the formula:

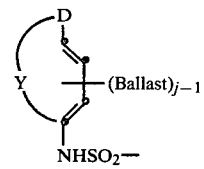

wherein:
(a) Ballast is an organic ballasting radical of such molecular size and configuration as to render said compound nondiffusible in said photographic element during development in an alkaline processing composition;
(b) D is $OR^1$ or $NHR^2$ wherein $R^1$ is hydrogen or a hydrolyzable moiety and $R^2$ is hydrogen or a substituted or unsubstituted alkyl group of 1 to 22 carbon atoms;
(c) Y represents the atoms necessary to complete a benzene nucleus, a naphthalene nucleus, or a 5 to 7 membered heterocyclic ring; and
(d) j is a positive integer of 1 to 2 and is 2 when D is $OR^1$ or when $R^2$ is hydrogen or an alkyl group of less than 8 carbon atoms.

12. The photographic element of claim 11 wherein D is OH, j is 2 and Y is a naphthalene nucleus.

13. The photographic element of claim 1 wherein said diffusible yellow dye moiety or precursor thereof is released from said nondiffusible compound as an inverse function of said development of said silver halide emulsion layer under alkaline conditions.

14. The photographic element of claim 13 wherein said ballasted carrier moiety is a group having the formula:

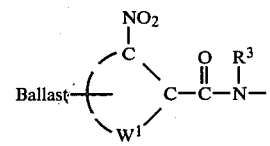

wherein:
Ballast is an organic ballasting radical of such molecular size and configuration as to render said compound nondiffusible in said photographic element during development in an alkaline processing composition;
$W^1$ represents at least the atoms necessary to complete a benzene nucleus; and
$R^3$ is an alkyl radical having 1 to about 4 carbon atoms.

15. The photographic element of claim 13 wherein said ballasted carrier moiety is a group having the formula:

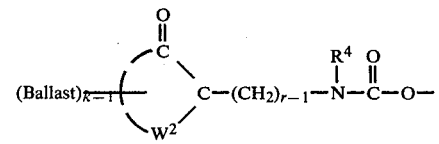

wherein:

Ballast is an organic ballasting radical of such molecular size and configuration as to render said compound nondiffusible in said photographic element during development in an alkaline processing composition;

W² represents at least the atoms necessary to complete a quinone nucleus;

r is a positive integer of 1 or 2;

R⁴ is an alkyl radical having 1 to about 40 carbon atoms or an aryl radical having 6 to about 40 carbon atoms; and k is a positive integer of 1 to 2 and is 2 when R⁴ is a radical of less than 8 carbon atoms.

16. The photographic element of claim 13 wherein said ballasted carrier moiety is a group having the formula:

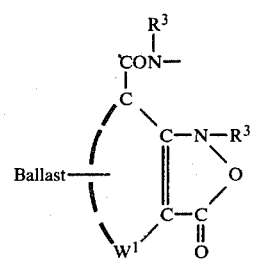

wherein:

Ballast is an organic ballasting radical of such molecular size and configuration as to render said compound nondiffusible in said photographic element during development in an alkaline processing composition;

W¹ represents at least the atoms necessary to complete a benzene nucleus; and

R³ is an alkyl radical having 1 to about 4 carbon atoms.

17. The photographic element of claim 13 wherein said ballasted carrier moiety is a group having the formula:

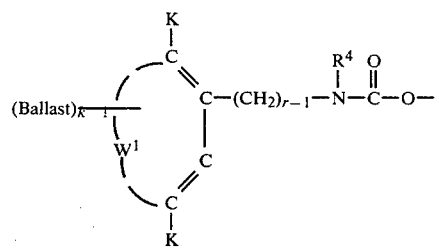

wherein:

Ballast is an organic ballasting radical of such molecular size and configuration as to render said compound nondiffusible in said photographic element during development in an alkaline processing composition;

W¹ represents at least the atoms necessary to complete a benzene nucleus;

r is a positive integer of 1 or 2;

R⁴ is an alkyl radical having 1 to about 40 carbon atoms or an aryl radical having 6 to about 40 carbon atoms;

k is a positive integer of 1 to 2 and is 2 when R⁴ is a radical of less than 8 carbon atoms; and K is OH or a hydrolyzable precursor thereof.

18. The photographic element of claim 1 wherein said nondiffusible compound comprises:

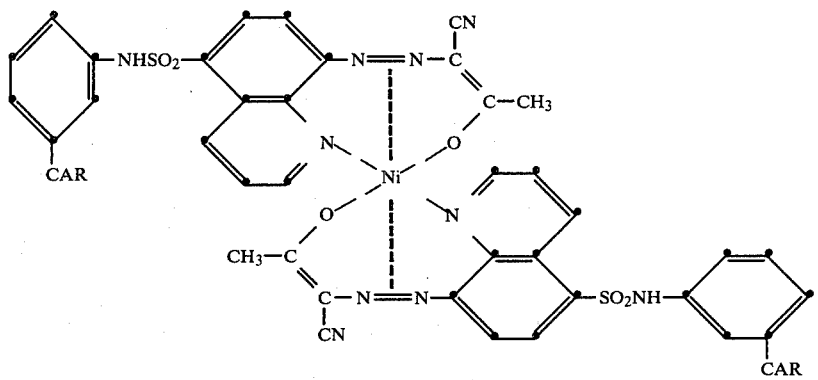

19. The photographic element of claim 1 wherein said nondiffusible compound comprises:

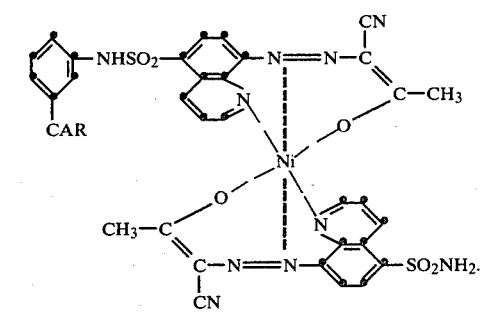

20. In a photographic assemblage comprising:
   (i) a support having thereon at least one photosensitive silver halide emulsion layer having associated therewith a dye image-providing material; and
   (ii) a dye image-receiving layer; the improvement wherein said dye image-providing material is a nondiffusible compound having at least one releasable yellow dye moiety or precursor thereof, said compound having the formula:

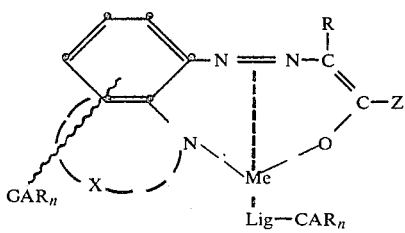

wherein:
(a) X represents the atoms necessary to complete a 5- or 6-membered aromatic heterocyclic fused ring;
(b) Z represents alkyl, substituted alkyl, aryl or substituted aryl;
(c) R represents CN or J—L;
(d) J represents a bivalent

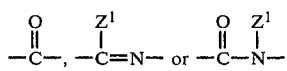

group;
(e) L represents alkyl, substituted alkyl, aryl, substituted aryl, or can be taken together with Z to complete a carbonyl-containing 5- or 6-membered heterocyclic or carbocyclic ring;
(f) $Z^1$ represents the same groups as Z;
(g) each CAR independently represents a ballasted carrier moiety capable of releasing said diffusible yellow dye moiety or precursor thereof as a function of development of said silver halide emulsion layer under alkaline conditions;
(h) each n is 0 or 1, with the proviso that at least one n is 1;
(i) Lig is a monoanionic tridentate ligand; and
(j) Me is a polyvalent, hexacoordinate metal ion.

21. In a photographic assemblage comprising:
(i) a support having thereon at least one photosensitive silver halide emulsion layer having associated therewith a dye image-providing material;
(ii) a dye image-receiving layer; and
(iii) an alkaline processing composition and means containing same for discharge within said assemblage; said assemblage containing a silver halide developing agent; the improvement wherein said dye image-providing material is a nondiffusible compound having at least one releasable yellow dye moiety or precursor thereof, said compound having the formula:

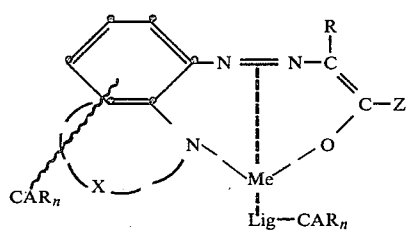

wherein:

(a) X represents the atoms necessary to complete a 5- or 6-membered aromatic heterocyclic fused ring;
(b) Z represents alkyl, substituted alkyl, aryl or substituted aryl;
(c) R represents CN or J—L;
(d) J represents a bivalent

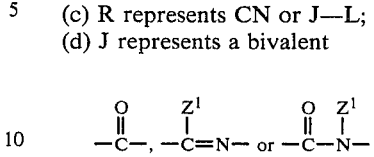

group;
(e) L represents alkyl, substituted alkyl, aryl, substituted aryl, or can be taken together with Z to complete a carbonyl-containing 5- or 6-membered heterocyclic or carbocyclic ring;
(f) $Z^1$ represents the same groups as Z;
(g) each CAR independently represents a ballasted carrier moiety capable of releasing said diffusible yellow dye moiety or precursor thereof as a function of development of said silver halide emulsion layer under alkaline conditions;
(h) each n is 0 or 1, with the proviso that at least one n is 1;
(i) Lig is a monoanionic tridentate ligand; and
(j) Me is a polyvalent, hexacoordinate metal ion.

22. The photographic assemblage of claim 21 wherein said Me is either zinc(II), nickel(II), copper(II), cobalt(II), cobalt(III), platinum(II), palladium(II) or chromium(III).

23. The photographic assemblage of claim 21 wherein said Me is nickel(II).

24. The photographic assemblage of claim 21 wherein said Lig is selected from the group consisting of o-(2-aminoethylamino)phenol, o-(2-pyridylmethylamino)phenol, N-(2-aminoethyl)glycine, N-(2-pyridylmethylamino)glycine, N-(3-hydroxyl-2-pyridylmethylamino)glycine, 2-aminomethyl-1-methyl-4-imidazolecarboxylic acid, and tridentate dye moieties.

25. The photographic assemblage of claim 21 wherein said Lig is a monomeric tridentate dye moiety such that the resulting nondiffusible compound has the following formula:

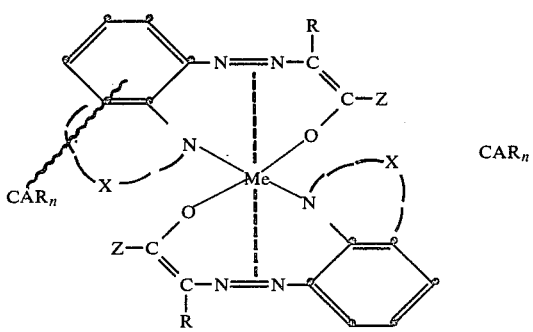

wherein each X, Z, R, CAR, n and Me is defined as in claim 21.

26. The photographic assemblage of claim 21 wherein X represents the atoms necessary to complete a quinoline, quinoxaline or benzimidazole ring.

27. The photographic assemblage of claim 21 wherein X represents the atoms necessary to complete a quinoline ring, Z is alkyl and R is CN.

28. The photographic assemblage of claim 27 wherein a CAR is attached to the 5-position of the quinoline ring.

29. The photographic assemblage of claim 21 wherein:
   (a) said dye image-receiving layer is located between said support and said silver halide emulsion layer; and
   (b) said assemblage also includes a transparent cover sheet over the layer outermost from said support.

30. The photographic assemblage of claim 29 wherein said cover sheet has thereon, in sequence, a neutralizing layer and a timing layer.

31. The photographic assemblage of claim 30 wherein said discharging means is a rupturable container containing said alkaline processing composition and an opacifying agent, said container being so positioned during processing of said assemblage that a compressive force applied to said container will effect a discharge of the container's contents between said transparent sheet and the layer outermost from said support.

32. The photographic assemblage of claim 21 wherein said support having thereon said photosensitive silver halide emulsion layer is opaque and said dye image-receiving layer is located on a separate transparent support superposed over the layer outermost from said opaque support.

33. The photographic assemblage of claim 32 wherein said transparent support has thereon, in sequence, a neutralizing layer, a timing layer and said dye image-receiving layer.

34. In an integral photographic assemblage comprising:
   (i) a photosensitive element comprising a transparent support having thereon the following layers in sequence: a dye image-receiving layer, an alkaline solution-permeable, light-reflective layer, an alkaline solution-permeable, opaque layer, a red-sensitive silver halide emulsion layer having a ballasted cyan dye releaser associated therewith, a green-sensitive silver halide emulsion layer having a ballasted magenta dye releaser associated therewith, and a blue-sensitive silver halide emulsion layer having a ballasted yellow dye releaser associated therewith;
   (ii) a transparent sheet superposed over said blue-sensitive silver halide emulsion layer and comprising a transparent support having thereon, in sequence, a neutralizing layer and a timing layer; and
   (iii) a rupturable container containing an alkaline processing composition and an opacifying agent which is so positioned during processing of said assemblage that compressive force applied to said container will effect a discharge of the container's contents between said transparent sheet and said blue-sensitive silver halide emulsion layer; said assemblage containing a silver halide developing agent; the improvement wherein said ballasted yellow dye releaser has the formula:

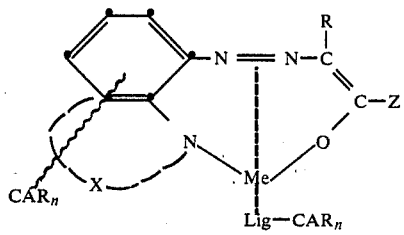

wherein:
(a) X represents the atoms necessary to complete a 5- or 6-membered aromatic heterocyclic fused ring;
(b) Z represents alkyl, substituted alkyl, aryl or substituted aryl;
(c) R represents CN or J—L;
(d) J represents a bivalent

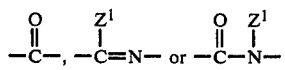

group;
(e) L represents alkyl, substituted alkyl, aryl, substituted aryl, or can be taken together with Z to complete a carbonyl-containing 5- or 6-membered heterocyclic or carbocyclic ring;
(f) $Z^1$ represents the same groups as Z;
(g) each CAR independently represents a ballasted carrier moiety capable of releasing said diffusible yellow dye moiety or precursor thereof as a function of development of said silver halide emulsion layer under alkaline conditions;
(h) each n is 0 or 1, with the proviso that at least one n is 1;
(i) Lig is a monoanionic tridentate ligand; and
(j) Me is a polyvalent, hexacoordinate metal ion.

35. A process for producing a photographic transfer image in color in an imagewise-exposed photographic element comprising a support having thereon at least one photosensitive silver halide emulsion layer, said emulsion layer having associated therewith a nondiffusible compound having at least one releasable yellow dye moiety or precursor thereof, said compound having the formula:

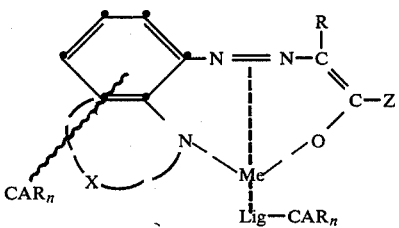

wherein:
(a) X represents the atoms necessary to complete a 5- or 6-membered aromatic heterocyclic fused ring;
(b) Z represents alkyl, substituted alkyl, aryl or substituted aryl;
(c) R represents CN or J—L;
(d) J represents a bivalent

group;
(e) L represents alkyl, substituted alkyl, aryl, substituted aryl, or can be taken together with Z to complete a carbonyl-containing 5- or 6-membered heterocyclic or carbocyclic ring;
(f) $Z^1$ represents the same groups as Z;
(g) each CAR independently represents a ballasted carrier moiety capable of releasing said diffusible yellow dye moiety or precursor thereof as a function of development of said silver halide emulsion layer under alkaline conditions;
(h) each n is 0 or 1, with the proviso that at least one n is 1;
(i) Lig is a monoanionic tridentate ligand; and
(j) Me is a polyvalent, hexacoordinate metal ion, said process comprising:

(i) treating said photographic element with an alkaline processing composition in the presence of a silver halide developing agent to effect development of each of the exposed silver halide emulsion layers;
(ii) said dye-releasing compound then releasing said diffusible yellow dye or precursor thereof imagewise as a function of said development of each of said silver halide emulsion layers; and
(iii) at least a portion of said imagewise distribution of said yellow dye or precursor thereof diffusing to a dye image-receiving layer to form a metal-complexed, yellow dye transfer image.

36. The process of claim 35 wherein X represents the atoms necessary to complete a quinoline, quinoxaline or benzimidazole ring.

37. The process of claim 35 wherein X represents the atoms necessary to complete a quinoline ring, Z is alkyl and R is CN.

38. The process of claim 37 wherein CAR is attached to the 5-position of the quinoline ring.

* * * * *